United States Patent

Goeldner

Patent Number: 5,457,678
Date of Patent: Oct. 10, 1995

[54] METHOD AND CIRCUIT ARRANGEMENT FOR THE TRANSMISSION OF MESSAGE PACKETS ACCORDING TO THE ASYNCHRONOUS TRANSFER MODE IN A COMMUNICATION NETWORK

[75] Inventor: Ernst-Heinrich Goeldner, Munich, Germany

[73] Assignee: Siemens Aktiengesellschaft, Munich, Germany

[21] Appl. No.: 235,924

[22] Filed: May 2, 1994

[30] Foreign Application Priority Data

May 28, 1993 [DE] Germany ............ 43 17 951.7

[51] Int. Cl.$^6$ ............................................ H04L 12/56
[52] U.S. Cl. .................... 370/13; 370/60.1; 370/94.2
[58] Field of Search ............................ 370/13, 14, 16, 370/17, 54, 55, 56, 58.1, 58.2, 58.3, 60, 60.1, 94.1, 94.2, 100.1, 108; 379/258, 268, 269, 271, 273, 272, 279, 291, 335; 340/825.03, 826, 827, 825.79, 825.8; 371/8.1, 8.2, 11.1, 11.2, 20.1, 20.4, 24, 27

[56] References Cited

U.S. PATENT DOCUMENTS

| | | | |
|---|---|---|---|
| 5,153,578 | 10/1992 | Izawa et al. ............ | 370/60.1 |
| 5,257,311 | 10/1993 | Naito et al. ............. | 370/94.1 |
| 5,283,782 | 2/1994 | Takase et al. ............ | 370/60 |
| 5,313,453 | 5/1994 | Uchida et al. ........... | 370/13 |
| 5,317,561 | 5/1994 | Fischer et al. ........... | 370/13 |
| 5,325,358 | 6/1994 | Goeldner ................. | 370/60 |
| 5,343,463 | 8/1994 | van Tetering et al. ... | 370/13 |

*Primary Examiner*—Alpus Hsu
*Attorney, Agent, or Firm*—Hill, Steadman & Simpson

[57] ABSTRACT

Transmission of the message packets according to asynchronous transfer mode ensues separately on at least two completely different transmission paths having ATM switching equipments (ASW1 ... , ASW2 ... ) or ATM cross-connectors (ACC1 ... , ACC2). An acquisition of test message packets transmitted at the transmission side and switched on the different transmission paths ensues on the basis of an interface controller unit (CCU) located at a respective subscriber of the network. Compensation is provided of the differences in running time of the message packets caused by the different transmission paths on the basis of the reception points in time. One of a plurality of identical message packets transmitted on the different transmission paths is output to a subscriber.

7 Claims, 1 Drawing Sheet

METHOD AND CIRCUIT ARRANGEMENT FOR THE TRANSMISSION OF MESSAGE PACKETS ACCORDING TO THE ASYNCHRONOUS TRANSFER MODE IN A COMMUNICATION NETWORK

BACKGROUND OF THE INVENTION

The present invention is directed to a method and circuit arrangement for the transmission of message packets according to the asynchronous transfer mode (ATH) during the course of virtual connections over at least one ATM switching equipment or an ATH cross-connector in a communication network having a plurality of subscribers.

Communication in public, as well as, in private networks must provide an uninterrupted undisturbed transmission of message packets according to the asynchronous transfer mode (ATM) between the subscribers. High demands are made of the availability of the connections in the entire ATM communication network, particularly when exchanging data. This is true, for example, for the subscribers of a broad band communication network, for example the broad band ISDN (Integrated Services Digital Network), having data applications in the commercial field such as, for example, when coupling a plurality of computer centers or internal data networks (Local Area Network, Metropolitan Area Network). Such applications are characterized by a high data rate of an individual ATM transmission line (for example, 150 Mbit/s), failure of which affects many subscribers.

In this context, European reference EP-A1 0 384 936 discloses an ATM switching equipment that is redundantly designed in order to insure a disturbance-free switching service for each of the virtual connections in that ATM communication network. Over and above this, there are stand-by circuit measures in ATM cross-connectors for the case wherein connections are briefly unavailable because of line outages or the like. For assuring a high availability of the connections, it is necessary that the subscribers themselves must switch between a used subscriber line and an additional stand-by subscriber line. An interruption-free connection between the subscribers of the data exchange is thus not possible.

SUMMARY OF THE INVENTION

It is an object of the present invention to provide a method and circuit arrangement of the type initially cited such that an uninterrupted disturbance-free transmission of the message packets according to the asynchronous transfer mode is established network-wide between the subscribers.

In general terms the method of the present invention is for the transmission of message packets according to asynchronous transfer mode during the course of virtual connections over at least one ATM switching equipment or ATM cross-connector in a communication network having a plurality of subscribers. Identical test message packets are transmitted before the transmission of a first message packet. Respective test message packets are transmitted from an interface controller unit of a transmitting subscriber on at least two different transmission paths having ATM switching equipment or ATM cross-connectors, the two transmission paths being different from one another. Reception points in time for the test message packets switched on the different transmission paths are identified by the interface controller unit of the receiving subscriber. Differences in the running times of the test message packets switched on the different transmission paths are compensated on the basis of the reception points in time. Identical message packets are separately transmitted between the subscribers over the different transmission paths having the ATM switching equipment or ATM cross-connectors and respectively one of these message packets is output.

In an advantageous development of the present invention the interface controller unit has a buffer memory for each transmission path for delaying the transmitted message packets for the purpose of compensating the differences in running time. The transmitted message packets can be respectively delayed by a multiple of a message packet. A binary test pattern having a defined bit combination is employed as test message packet. A circuit arrangement of the present invention for the transmission of message packets according to the asynchronous transfer mode during the course of virtual connections over at least one ATM switching equipment or ATM cross-connector in a communication network having a plurality of subscribers, has the following elements. At least two different transmission paths having ATM switching equipment or ATM cross-connectors separated from one another are provided between subscribers of the communication network. Offering trunks and serving trunks thereof are respectively connected to interface controller units of a transmitting subscriber and of a receiving subscriber. The interface controller unit has: means for generating a test message packet that is transmitted before the transmission of the first message packet from the transmitting subscriber and is transmitted on the different transmission paths via the separate ATM switching equipment or ATM cross-connectors; a means for identifying reception points in time for the test message packets switched on the different transmission paths; means for compensating differences in the running times of the switched message packets on the basis of the identified reception points in time; and a means for the output of one of a plurality of identical message packets transmitted on the different transmission paths via the separate ATM switching equipment or ATM cross-connectors.

In an advantageous development of the present invention the means for compensating differences in running time are respectively composed of a buffer memory for each transmission path for delaying the transmitted message packets.

The transmission of the message packets according to the asynchronous transfer mode ensues on at least two completely different transmission paths having separate ATM switching equipment or separate ATM cross-connectors that can be redundantly designed according to European reference EP-A1-384 936(corresponding to U.S. Pat. No. 5,325, 358). Thus, redundant connections on different paths result up to the immediate proximity of the individual subscriber, so that a continuous connection for an uninterrupted disturbance-free communication between a first subscriber and a second subscriber is always available network-wide given line outages. It is assured on the basis of the compensation of the differences in running time caused by the different transmission paths that only statistical fluctuations influence the reception points in time of a message packet and the copy thereof at the subscriber, but not the deviations established by the different transmission paths. The differences in running time on the different transmission paths established network-wide can thus be reduced to a minimum in the communication network.

It is advantageous to achieve the compensation of the differences in running time by delaying the respectively transmitted message packets with a buffer memory per transmission path before one of the arriving identical message packets is output to the subscriber.

It is also advantageous to be able to respectively delay the transmitted message packets by a multiple of a single message packet. As a result the compensation of the differences in running time between the different transmission paths can be matched to one another in a simple way. It is advantageous to employ a binary test pattern having a defined bit combination as a test message packet, so that the test message packet can be distinguished from the message packets containing the useful information.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
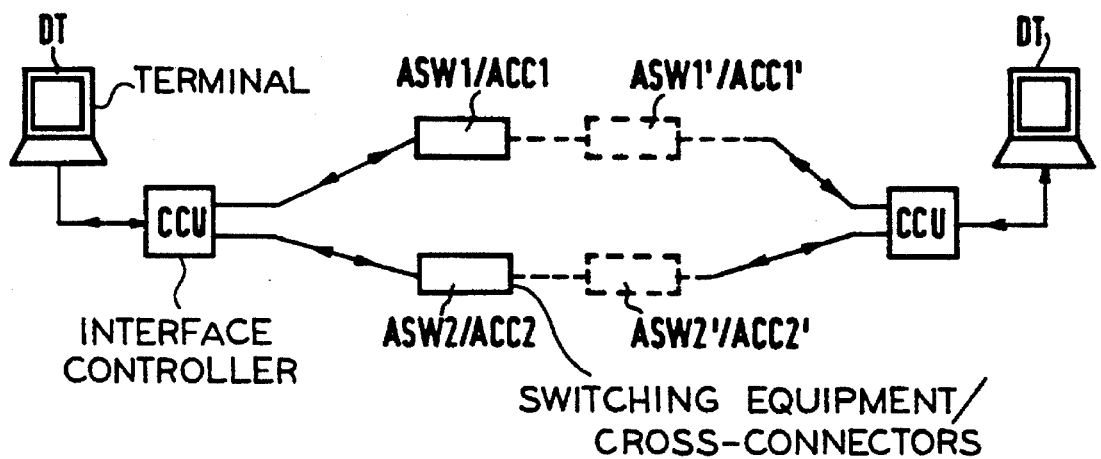
FIG. 1 is a block circuit diagram of an ATM communication network for the interruption-free transmission of message packets on different network-wide transmission paths.

FIG. 1 schematically shows two subscribers of a communication network that exchange message packets via their terminal equipment DT (for example, data terminals) during the course of virtual connections according to an asynchronous transfer mode ("Asynchronous Transfer Mode-ATM"). The message packets are a matter of packets having a fixed length, each of which has a packet header having the particulars indicating the respective virtual connection as well as an information part. The information part contains the actual message signals that can comprise voice and image signals in digital form in addition to data and/or text signals.

The disturbance-free uninterrupted data exchange is based, for example, on the redundancy principle of European reference EP-A1 384 936 (corresponding to U.S. Pat. No. 5,325,358) for ATM switching equipment or for ATM cross-connectors and is expanded network-wide onto connections up to the immediate proximity of the subscriber. The redundant network-wide connections are thereby conducted over different transmission paths in the communication network, so that one connection is not always negatively affected by line or system outages. As perceived from FIG. 1, an interface or connection controller unit CCU is located at the respective subscriber. This interface controller unit CCU has equipment according to FIG. 2 that are active dependent on transmission or reception of message packets.

In the redundancy concept disclosed by European reference EP-A1 384 936 (corresponding to U.S. Pat. No. 5,325, 358), the parallel paths of a message packet and the copy thereof are identical through the ATM switching equipment, whereas completely different transmission paths having separate ATM switching equipment or separate ATM cross-connectors are selected in the present ATM communication network for the transmission of a message packet and the copy thereof. As depicted in FIG. 1, a first transmission path has one or more, successive ATM switching equipment ASW1', ASW1' or ATM cross-connectors ACC1', ACC1' whereas one or more ATM switching equipment ASW2, ASW2 or ATM cross-connectors ACC2, ACC2 lie in a second transmission path. Each of the individual ATM switching equipment ASW1 . . . or ATM cross-connectors ACC1 . . . has a plurality of offering trunks and serving trunks available to them via which the transmission of the message packets ensues during the course of the virtual connections.

Figure 2:
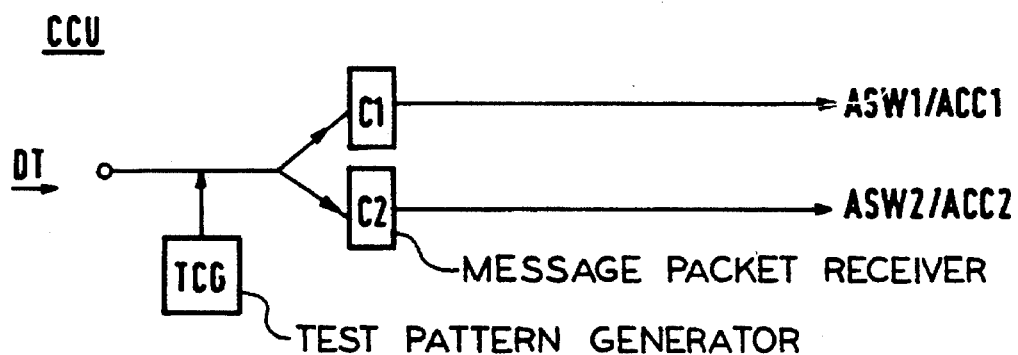
FIG. 2 depicts one embodiment of an interface controller at the subscribers of the communication network which is only schematically shown in FIG. 1.
Figure 2:
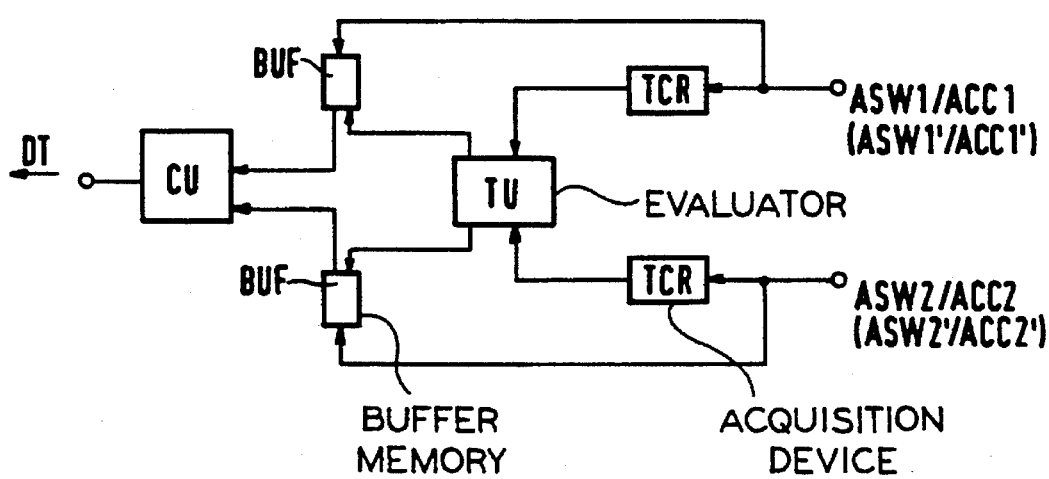

FIG. 2 shows a possible structure of the interface controller unit CCU arranged at the subscriber that, in addition to assuming a few functions of the transmission side and reception side known from European reference EP-A1 384 936 (corresponding to U.S. Pat. No. 5,325 358), assumes special jobs on the basis of appropriate equipment. Only those circuit parts of the interface controller unit CCU that are required for an understanding of the present invention are thereby schematically shown.

The transmission-side function in the interface controller unit CCU covers equipment C1 and C2 allocated to the different transmission paths for the acceptance of the incoming message packet on the subscriber line from the data terminal DT and for defining the two individual connections in the network for the transmission paths. The respective connection through the ATM network from the first subscriber to the second subscriber is produced by a virtual channel number (virtual channel identifier VCI) in combination with a virtual path number (virtual path identifier, VPI). The two numbers contained in the packet header of the incoming message packet are converted by the equipment C1 and C2 into numbers individually defined for each transmission path. These numbers serve the purpose of forwarding the message packet via the serving trunk of the ATM switching equipment ASW1 or of the ATM cross-connector ACC1 and of the ATM switching equipment ASW2 or of the ATM cross connector ACC2 for the respective virtual connection.

Over and above this, a sequence number for the unambiguous allocation of the message packet switched via the first transmission path to the identical message packet switched on the second transmission path is co-transmitted. This sequence number is composed, for example, of the sequence number employed in the ATM adaptation layer for monitoring the packet sequence.

In order to assure the unambiguous allocation of the identical message packets switched on completely different transmission paths, the difference between the running times that potentially differ greatly from one another for the two message packets switched via the ATM switching equipment ASW1 . . . or ATM cross-connectors ACC1 . . . and via the ATM switching equipment ASW2 . . . or ATM cross-connectors ACC2 . . . is identified after the call setup. One or more test message packets, each respectively composed of a test patterns with a defined bit combination, is thereby generated at the transmission side by a means TCG in the interface controller unit CCU and is respectively transmitted both of the first as well as on the second transmission path to the reception side as first information preceding the actual message signals.

The reception-side function in the interface controller unit CCU respectively covers one acquisition means TCR per transmission path which recognizes the identical test message packets switched by the ATM switching equipment ASW1 . . . or, respectively, ASW2 . . . or by the ATM cross-connectors ACC1 . . . or, respectively, ACC2 . . . and are made available to an evaluation unit TU that is connected to the acquisition means TCR. The evaluation unit TU identifies the reception points in time of the test message packets arriving on the two different transmission paths and having the identical content. On the basis of the identified reception points in time, utilizes a buffer memory BUF lying in the respective transmission path such that the test message packet that arrives first is delayed in comparison to the identical test message packet arriving later. For example, the buffer memory BUF is fashioned as a turnaround memory (FIFO memory).

The delay of the one message packet in comparison to the other message packet thereby ensues in multiples of a single message packet. The two buffer memories BUF provided for the various transmission paths have their output sides connected to a further means CU that, like the evaluation means disclosed by European reference EP-A1 384 936 (corresponding to U.S. Pat. No. 5,325, 358), accepts the message packets switched on the different transmission paths and, by evaluating the sequence number respectively attached to the identical message packets, outputs only one of the two message packets to the subscriber at the receptions side via the subscriber line to the data terminal DT.

As a result of the separate equipment in the interface controller unit CCU, an uninterrupted disturbance-free data exchange on different transmission paths is guaranteed up to the subscriber, whereby differences in running time that are caused by the different transmission paths in the communication network are reduced to a minimum. It is thus assured that only statistical fluctuations, rather than differences in running time, that occur on the two network-wide connections influence the arrival time of a message packet and the copy thereof at the subscribers.

One application of the present invention, for example, is in a broad band communication network, for example the broad band ISDN (Integrated Services Digital Network), wherein a high fail safety is required for the connections between the subscribers. it is particularly data applications such as, for example, the coupling of a plurality of computer centers or internal data networks via such a broad band communication network that require a communication operation functioning disturbance-free, since the outage of a single broad band line affects a number of users given the high data rates of the individual ATM lines.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting message packets according to asynchronous transfer mode (ATM) during virtual connections over ATM switching equipments or ATM cross-connectors in a communication network having a plurality of subscribers, comprising the steps of:

transmitting identical test message packets before transmission of a first message packet, the identical test message packets being transmitted from an interface controller unit of a transmitting subscriber over at least two different transmission paths, each transmission path having at least one ATM switching equipment or at least one ATM cross-connector;

identifying reception points in time for the test message packets switched on the different transmission paths by an interface controller unit of a receiving subscriber, and compensating differences in a running times of the test message packets switched on the different transmission paths on the basis of the reception points in time; and separately transmitting identical message packets between the subscribers over the at least two different transmission paths, and outputting one of these identical message packets.

2. The method according to claim 1, wherein each of the interface controller units has a plurality of buffer memories such that each transmission path of the at least two different transmission paths has an associated buffer memory for delaying the transmitted identical message packets thereby compensating for differences in running time of the identical message packets.

3. The method according to claim 2, wherein the transmitted identical message packets are respectively delayed by a multiple of a message packet.

4. The method according to claim 1, wherein the test message packet is a binary test pattern having a defined bit combination.

5. A circuit arrangement for transmission of message packets according to asynchronous transfer mode (ATM) during virtual connections over ATM switching equipments or ATM cross-connectors in a communication network having a plurality of subscribers and having offering trunks and serving trunks, comprising:

at least two different transmission paths, each transmission path having at least one ATM switching equipment or at least one ATM cross-connector, the two different transmission paths being separated from one another and connected between subscribers of the communication network, the offering trunks and serving trunks of the two different transmission paths being respectively connected to an interface controller unit of a transmitting subscriber and an interface controller unit of a receiving subscriber; and each interface controller unit of the transmitting subscriber and the receiving subscriber having, means for generating a test message packet that is transmitted before the transmission of a first message packet from the transmitting subscriber over each of the at least two different transmission paths via the separate ATM switching equipments or ATM cross-connectors, means for identifying reception points in time for the test message packets switched on the different transmission paths, means for compensating differences in running times of the switched message packets on the basis of the identified reception points in time, and means for outputting one of a plurality of identical message packets transmitted on the different transmission paths via the separate ATM switching equipments or ATM cross-connectors.

6. The circuit arrangement according to claim 5, wherein the means for compensating differences in running time has a plurality of buffer memories such that each transmission path of the at least two different transmission paths has an associated buffer memory for delaying the transmitted message packets.

7. A circuit arrangement for transmission of message packets according to asynchronous transfer mode (ATM) during virtual connections over ATM switching equipments or ATM cross-connectors in a communication network having a plurality of subscribers and having offering trunks and serving trunks, comprising:

at least two different transmission paths, each transmission path having at least one ATM switching equipment or at least one ATM cross-connector, the two different transmission paths being separated from one another and connected between subscribers of the communication network, the offering trunks and serving trunks of the two different transmission paths being respectively connected to an interface controller unit of a transmitting subscriber and an interface controller unit of a receiving subscriber; and each interface controller unit of the transmitting subscriber and the receiving subscriber having, means for generating a test message packet that is transmitted before the transmission of a first message packet from the transmitting subscriber over each of the at least two different transmission paths via the separate ATM switching equipments or ATM cross-connectors, means for identifying reception points in time for the test message packets switched on the different transmission paths, means for compensating differences in running times of the switched message packets on the basis of the identified reception points in time, said means for compensating differences in running time having a plurality of buffer memories such that each transmission path of the at least two different transmission paths has an associated buffer memory for delaying the transmitted message packets, and means for outputting one of a plurality of identical message packets transmitted on the different transmission paths via the separate ATM switching equipments or ATM cross-connectors.

* * * * *